(12) United States Patent
Schlack

(10) Patent No.: US 12,279,714 B2
(45) Date of Patent: Apr. 22, 2025

(54) BAG FOR PRODUCING BABY FOOD, DEVICE FOR CONTROLLING THE TEMPERATURE OF BABY FOOD, AND METHOD FOR PRODUCING BABY FOOD

(71) Applicant: SMIICS GMBH, Göttingen (DE)

(72) Inventor: Stefan Schlack, Göttingen (DE)

(73) Assignee: SMIICS GMBH, Göttingen (DE)

( * ) Notice: Subject to any disclaimer, the term of this patent is extended or adjusted under 35 U.S.C. 154(b) by 806 days.

(21) Appl. No.: 17/607,239

(22) PCT Filed: May 7, 2020

(86) PCT No.: PCT/EP2020/062677
§ 371 (c)(1),
(2) Date: Oct. 28, 2021

(87) PCT Pub. No.: WO2020/225352
PCT Pub. Date: Nov. 12, 2020

(65) Prior Publication Data
US 2022/0218143 A1 Jul. 14, 2022

(30) Foreign Application Priority Data
May 8, 2019 (DE) ...................... 10 2019 003 263.2

(51) Int. Cl.
*A47J 31/40* (2006.01)
*A47J 36/24* (2006.01)
*B65D 81/32* (2006.01)

(52) U.S. Cl.
CPC ......... *A47J 31/401* (2013.01); *A47J 36/2483* (2013.01); *B65D 81/3261* (2013.01)

(58) Field of Classification Search
CPC ...... A47J 31/401; A47J 31/402; A47J 31/404; A47J 31/405; A47J 31/407; A47J 36/2483;
(Continued)

(56) References Cited

U.S. PATENT DOCUMENTS

2016/0052705 A1* 2/2016 Murray .............. B65D 81/3266
206/277
2018/0229899 A1* 8/2018 Sung .................. B65D 41/0435
(Continued)

FOREIGN PATENT DOCUMENTS

| CN | 1247514 A | 3/2000 |
| CN | 101641072 A | 2/2010 |

(Continued)

*Primary Examiner* — Brian W Jennison
(74) *Attorney, Agent, or Firm* — Dilworth & Barrese, LLP

(57) ABSTRACT

The present invention relates to a bag (1) for the production of baby food, specifically baby milk or baby puree, comprising a first chamber (3) and a second chamber (5), which are separated from one another other by a separating region (7),
wherein the first chamber (3) is which is designed to receive a baby food concentrate,
wherein the second chamber (5) is designed to receive a fluid,
wherein the first and second chamber (3, 5) are arranged along the longitudinal direction (L) of the bag (1);
wherein the separating region (7) can be at least partially opened by the applying force to the bag (1) in order to be able to mix the components contained in the first and second chamber (3, 5) to form baby food,
wherein the bag (1) has a first opening (11) at a first end (9) located adjacent to the first chamber (3) and a second opening (15) at a second end (13) located adjacent to the second chamber (5), and
wherein the first opening (11) can be closed by means of a first closure and the second opening (15) can be closed by means of a second closure.
Furthermore, the invention relates to a device for tempering baby food and a process for producing baby food.

5 Claims, 8 Drawing Sheets

(58) Field of Classification Search
CPC .......... A61J 9/085; A61J 9/005; A61J 1/2093;
B65D 81/3261
See application file for complete search history.

(56) References Cited

U.S. PATENT DOCUMENTS

2019/0029461 A1* 1/2019 Schlack ................ A47J 31/407
2019/0231122 A1* 8/2019 Hanneken ........... A47J 36/2483

FOREIGN PATENT DOCUMENTS

| CN | 104797176 A | 7/2015 |
|----|-------------|--------|
| EP | 0920849 A2 | 6/1999 |
| WO | 95/26177 A1 | 10/1995 |
| WO | 98/29317 A1 | 7/1998 |

* cited by examiner

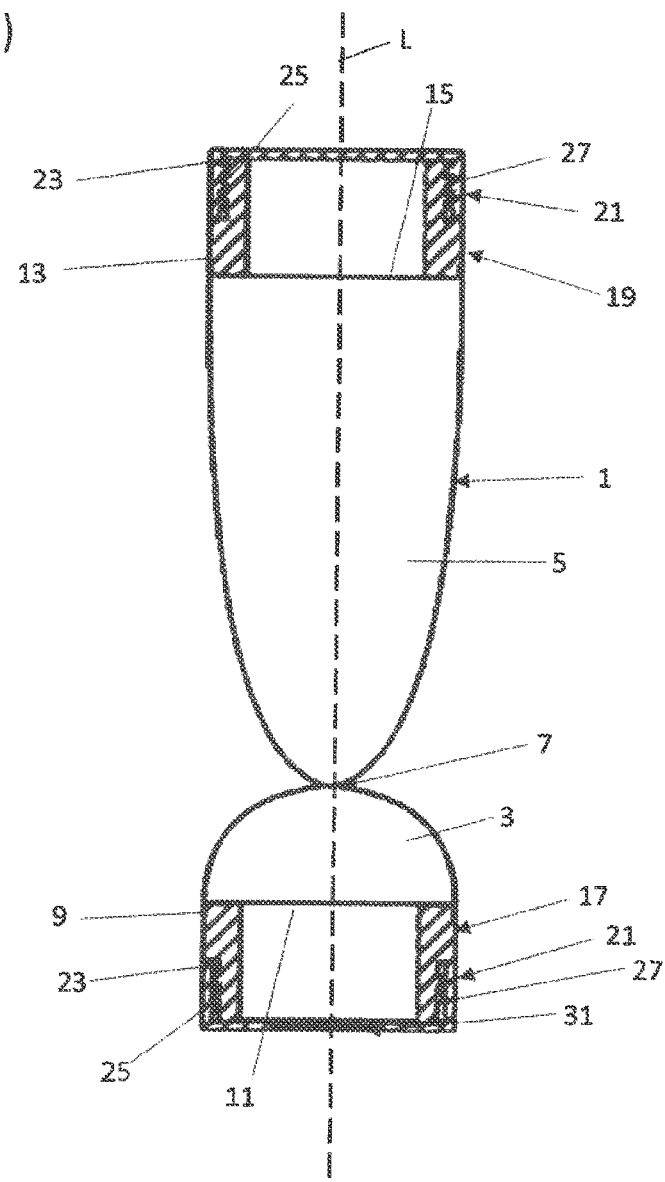

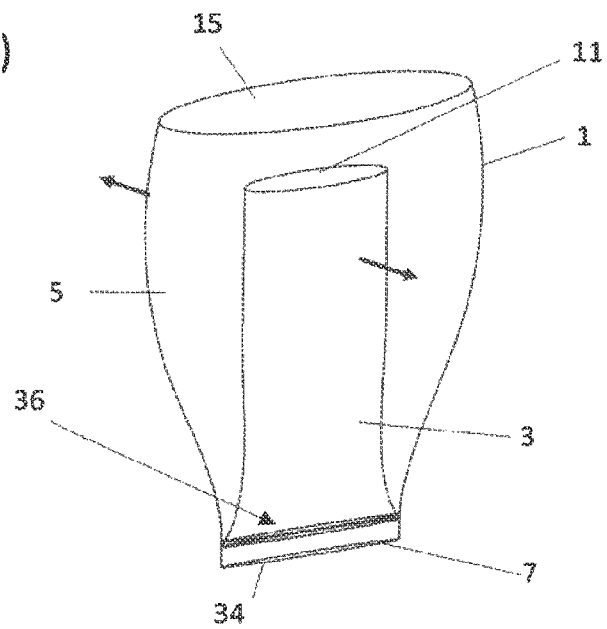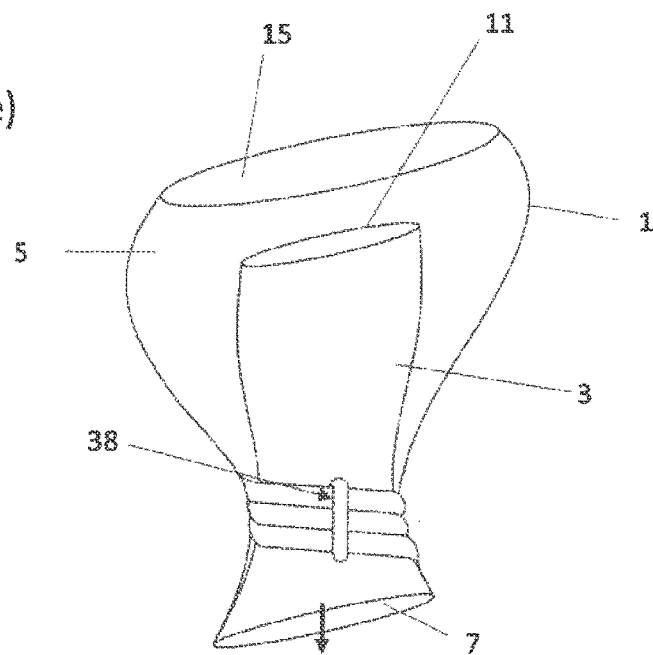

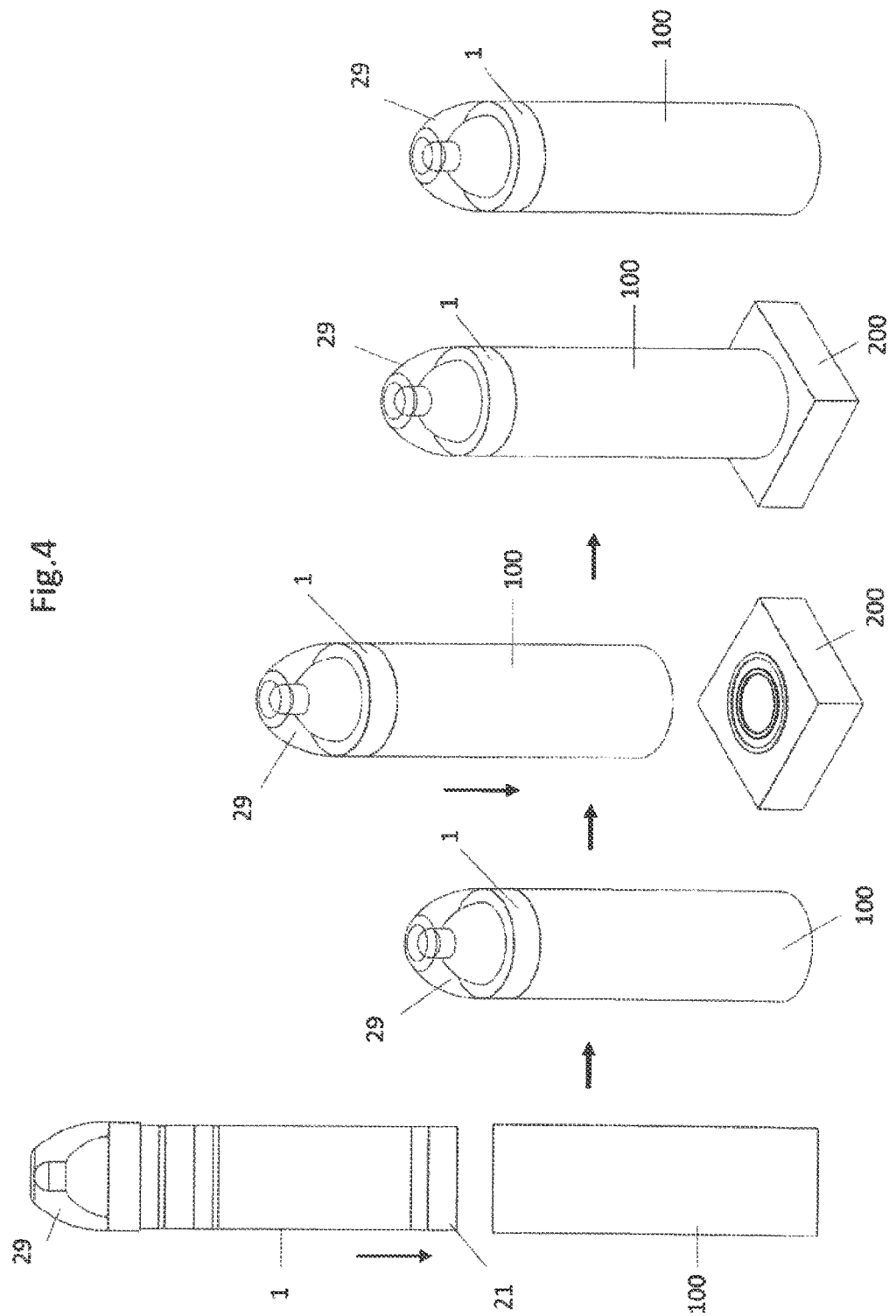

BAG FOR PRODUCING BABY FOOD, DEVICE FOR CONTROLLING THE TEMPERATURE OF BABY FOOD, AND METHOD FOR PRODUCING BABY FOOD

BACKGROUND OF THE INVENTION

The present invention relates to a bag for producing baby food, specifically baby milk or baby puree, a device for tempering baby food and a process for producing baby food.

In order to have baby food available on the go, parents usually need to carry a variety of utensils to be able to make baby food for the baby as needed. Usually, a thermos of boiled water is taken along, and the water must be cooled to a comfortable drinking temperature before use. In some cases, the boiled water has already cooled down too far, so that it is too cold for the baby. Alternatively, bottles of special baby water or pre-made milk can be taken, but these are not heated to a drinking temperature. In all cases, it is difficult or not possible to have the liquid at the appropriate drinking temperature for the baby.

Furthermore, thermos flasks and plastic containers in which the powder for baby food is carried represent open systems. There is therefore a risk of contamination. In other words, both the water and the powder for the baby food can only be stored in these systems to a limited extent.

Specifically, prefabricated milk does not allow free dosage.

In addition, parents must carry baby bottles with nipple attachments and a baby food concentrate, which when mixed with the water is the actual baby food. However, the baby bottles and nipple attachments must be cleaned and sterilized after use. Sterilization requires a stove specifically, for example to boil the bottles. However, a stove is usually difficult to find when travelling. In addition, cleaning and sterilizing is time-consuming.

All this means a lot of utensils for outings and especially for longer trips that parents have to carry with them and a baby food production process that regularly fails to reach the optimal drinking temperature.

SUMMARY OF THE INVENTION

This problem is solved by the invention described herein. Preferred embodiments are also the subject of the invention described herein.

According to a first aspect, the problem is solved by a bag for producing baby food, specifically baby milk or baby puree, comprising a first chamber and a second chamber separated from one another by a separating region, the first chamber being designed to contain a baby food concentrate, wherein the second chamber is designed to receive a fluid, wherein the first and second chamber are arranged along the longitudinal direction of the bag;

wherein the separating region can be at least partially opened by applying force to the bag in order to be able to mix the components contained in the first and second chambers to forma a baby food;

wherein the bag has a first opening at a first end adjacent to the first chamber and a second opening at a second end adjacent to the second chamber, and wherein the first opening can be closed by means of a first closure and the second opening can be closed by means of a second closure.

The "bag" represents a flexible container, which is preferably made of plastic, such as polyethylene. A composite film of polyethylene and polyamide is particularly preferred. Additional thermally conductive particles, such as aluminum and/or copper particles, may be incorporated into the bag material to provide improved or faster heating of the baby food. Specifically, the bag is designed for single use and can be disposed of after use.

The bag contains two chambers which are separated from one another by a separating region so that the baby food concentrate and the fluid cannot come into contact with each other and be mixed before use.

Specifically, the chambers are arranged along the longitudinal direction with the opposite ends of the bag being open. In this regard, a first opening is adjacent to the first chamber and a second opening is adjacent to the second chamber. Via the openings, the chambers can be filled (e.g. by the parents) with contents (e.g. the fluid and the baby food concentrate) in advance (e.g. at home) and subsequently closed by means of the first and second closures, respectively. This means that the baby food is already pre-portioned and can be mixed if necessary. Since the individual components of the baby food are stored separately, the baby food or the contents of the bag have a longer shelf life.

For mixing, the user applies force to the bag to at least partially break open or open the separating region so that the individual components or the content(s) of the bag can mix and the baby food can be produced. By shaking the bag, an optimal mixture can be produced.

Preferably, a first connecting element is arranged at the first opening and a second connecting element is arranged at the second opening, wherein the first connecting element can be connected to the first closure and the second connecting element can be connected to the second closure.

In contrast to the bag, the connecting element is preferably a rigid element so that the closure can be securely connected to the connecting element. Specifically, a secure connection is intended to prevent leakage of the bag.

The connecting element is preferably welded to the bag.

Preferably, the connecting elements can be connected to the closures by means of a screw cap.

For this purpose, the connecting elements are rotationally symmetrical and have a thread on their outer surface which engages in a thread on the respective closure. By screwing the closure onto the connecting element, a secure connection can be made between the bag and the closure.

It is preferred that the first and/or second closure is a cover or a nipple.

A cover is suitable for closing the bag. During transport, both openings of the bag can therefore preferably be closed with a cover. However, it is also possible for the baby to drink the baby food directly from the bag. For this purpose, a cover can be replaced by a nipple.

Preferably, at least one magnet is arranged in or on the cover.

This magnet can be connected to another magnet in the bottom area of a tempering module described later, which is designed for tempering of the baby food. By means of said magnetic connection, the bag can be fixed in the tempering module.

It is preferred that the separating region is provided by means of a weld seam.

Preferably, the separating region is configured to be at least partially opened by pulling the bag substantially in the longitudinal direction.

As described above, the first and second chamber are arranged in the longitudinal direction and are separated from one another by the separating region. The separating region is designed in such a way that a simple pull on the bag in this longitudinal direction leads to an at least partial rupture or opening of the separating region. In this case, one end of the bag can be pulled in the longitudinal direction while the other end is merely held. However, the bag may also be pulled apart in the longitudinal direction.

It is further preferred that the separating region is designed as a folding edge, at which the bag (1) is folded by a large angle of up to 180°.

The folded edge may be formed alternatively or in addition to the sealing edge. Preferably, the bag is folded such that the first and second chamber are at least partially superimposed. The folded edge may be fixed by an adhesive tape.

Preferably, the first and second chamber are separated from one another by at least one clamp.

Further, the bag may be twisted in the separating region.

A twisting of the bag creates a separating region, whereby the twisted state can be fixed for example, by an adhesive tape. As soon as the separating region is supposed to be opened, the adhesive tape can be removed or torn so that the twist can be released.

Preferably, the bag is formed from a flexible tube.

In other words, the bag is tubular in shape, the tube preferably is being made in one piece.

According to another aspect of the present invention, the underlying problem is solved by a device for tempering baby food, specifically baby milk or baby puree, the device comprising:

a tempering module which is designed to receive a bag for baby food, preferably a bag according to one of the preceding claims; and a connecting unit to which the tempering module can be connected, wherein the tempering module comprises at least one heating element which is designed for tempering the baby food contained in the tempering module, wherein the connecting unit comprises at least one rechargeable battery, which supplies the heating element with energy, and a control unit, which controls the heating process.

According to the aspect described above, the bag for baby food may be formed with at least two chambers. However, it is also possible for the bag to have only one chamber and one opening. Such a bag could contain breast milk or ready-made baby food. Specifically, the breast milk or ready-made baby food could be frozen in the bag and thawed or tempered to drinking or eating temperature in the tempering module.

The tempering module thus represents a receptacle in which a bag of baby food can be received in order to heat the baby food when required.

For mobile heating on the move, the tempering module can be connected to a connecting unit which has at least one rechargeable battery which supplies the heating element in the tempering module with energy. The heating process is thereby controlled by the control unit.

The device thus offers an easy tempering of baby food, which is stored in bags on the go. It is only necessary that the rechargeable battery is sufficiently charged.

Preferably, the tempering module has a rotationally symmetrical tempering module housing with a tempering module base surface and a tempering module insertion opening via which the bag can be inserted into the tempering module housing, and wherein the at least one heating element is arranged on an inner wall of the tempering module housing.

Preferably, the heating element is designed as a heating mat. The heating element can at least partially or completely overlap the inner wall of the tempering module housing. The heating element heats the inner wall of the tempering module housing, whereby heat is subsequently transferred from the inner wall of the tempering module housing to the bag which is inserted into the tempering module housing. A particularly fast tempering of the baby food can take place if the bag is at least partially in contact with the inner wall of the tempering module housing. The larger the contact surface, the faster the baby food can be heated.

The tempering module housing may include tempering module extension members that can be connected to one another in such a way that the height of the tempering module is individually adjustable.

In other words, the tempering module housing can have a modular structure. The individual tempering module extension elements are to be connected to each other in such a way that the desired height of the tempering module housing is obtained. For this purpose, the individual tempering module extension elements may be assembled and/or displaced relative to one another.

Preferably, the device further comprises a sterilization module for sterilizing baby accessories, specifically at least one baby pacifier or at least one nipple, can be connected to the connecting unit in order to carry out the sterilization process controlled by the control unit and to supply the sterilization module with energy from at least one rechargeable battery.

The sterilization module can be connected to the connecting unit in parallel with the tempering module. Alternatively, the connecting unit can be alternately connected to one of the modules. In this case, the connecting unit can be designed to be particularly space-saving.

With the additional option of sterilizing the reusable components, such as a baby nipple, or even a nipple, the device can additionally be used to perform on-the-go cleaning tasks on the baby accessories. Before the baby accessories are positioned in the sterilization module, the baby accessories can be easily cleaned under water or with a wet wipe.

It is preferred that the sterilization module comprises a sterilization module housing with a sterilization module base surface and a sterilization module insertion opening via which the baby accessories can be inserted into the sterilization module housing, wherein at least one UV lamp is arranged in the sterilization module housing, and wherein the sterilization module insertion opening can be closed by a sterilization module cover.

In order to distribute the radiation of the UV lamp in a particularly advantageous manner in the sterilization module housing, at least one UV mirror and/or at least one reflective surface can/could additionally be arranged in the sterilization module housing.

According to a still further aspect, the underlying problem is solved by a process for producing baby food, specifically puree, which comprises:

providing a bag with a first chamber and a second chamber which are separated from one another by a separating region;

filling a baby food concentrate into the first chamber via a first opening in the bag which is formed adjacent to the first chamber;

filling a fluid into the second chamber via a second opening in the bag which is formed adjacent to the second chamber;

closing the first opening with a first closure and the second opening with a second closure;

applying force to the bag so that the separating region is at least partially opened and the components contained in the first and second chambers are mixed with one another to form baby food.

Preferably, applying force to the bag comprises pulling the bag in a longitudinal direction, opening at least one clamp, unfolding the bag, or releasing a twisted condition of the bag.

It is further preferred that closing the first and second openings comprises screwing on a cover.

Preferably, after the individual components have been mixed, a cover is replaced by a nipple.

Preferably, the process comprises the step of inserting the bag in which the mixed components are located into a tempering module via a tempering module insertion opening for tempering of the baby food.

Preferably, the bag is inserted into the tempering module such that a nipple positioned on the first or second opening of the bag or a connector element positioned on the first or second opening rests on an edge of the tempering module insertion opening to prevent the nipple or connector element from scovering into the tempering module. This allows the tempering module to be used as a holding device for the baby food. The parents or the baby itself hold the temperature control module, in which the bag with the temperature-controlled baby food is arranged. The baby's nipple protrudes from the tempering module so that the baby can simply drink its baby food.

Furthermore, the bag can be held in a stretched (not collapsed) position in the tempering module by the nipple. This avoids folds in the bag and the bag can lie against the inner wall of the tempering module housing in a particularly advantageous manner. This facilitates the heating as well as the emptying of the bag during the drinking process.

In order to connect the bag securely to the tempering module and to prevent it from slipping out during the drinking process, the nipple or the connecting element, which rests on the edge of the temperature control module, can be connected to the tempering module by means of a click mechanism.

It is further preferred that the closure of the bag, which is arranged adjacent a tempering module base surface when inserted into the temperature control module, includes at least one magnet which is connected to a magnet in the tempering module bottom area.

By such a magnetic connection, the opposite end of the bag, where a closure and not the nipple is located, is also stretched in the longitudinal direction towards the tempering module bottom area. This further positions the bag within the tempering module, such that the above benefits can be effected in an even more advantageous manner. In addition, the bag is prevented from falling out of the tempering module.

BRIEF DESCRIPTION OF THE DRAWINGS

These and other objectives, features and advantages of the present invention will become clearer from a study of the following detailed description of preferred embodiments and the accompanying drawings. Further, it is noted that although embodiments are described separately, individual features of these embodiments may be combined to form additional embodiments.

FIG. 4 shows a tempering process according to a preferred embodiment for tempering the baby food in the bag;

DESCRIPTION OF THE PREFERRED EMBODIMENTS

Figure 1B:
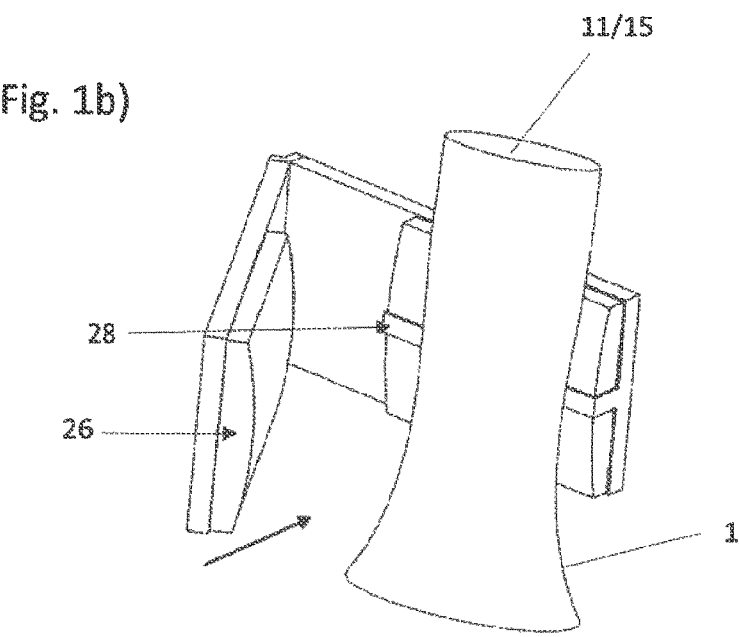
FIG. 1b) show schematic drawings of bag openings which are closed with and c) alternative closures.

FIG. 1 shows a bag 1 for the production of baby food according to a preferred embodiment. For the production of baby food, various baby food concentrates from different manufacturers are commercially available, which, when mixed with water, produce the required baby food. The baby food concentrate is typically in powder form. Specifically, the baby food concentrate may be milk powder or a puree powder. The bag 1 is preferably made of plastic (for example polyethylene or a composite film of polyethylene and polyamide) substantially in the form of a tube. Specifically, the tube is made in one piece without seams.

The bag 1 has at least one first chamber 3 and a second chamber 5, which are arranged along the longitudinal direction L. FIG. 1 shows for this purpose a sectional view along the longitudinal direction L. The chambers 3, 5 are separated or separated from one another by a separating region 7, the separating region 7 preferably having at least one weld seam. As shown in FIG. 1, the separating region 7 creates specifically a necking in the bag 1.

The opposite or opposing ends of the bag 1 with respect to the longitudinal direction L have openings. Specifically, a first opening 11 is designed at a first end 9 of the bag 1 adjacent to the first chamber 3, while a second opening 15 is designed at a second end 13 (opposite to the first end 9) of the bag 1 adjacent to the second chamber 5. The openings 11, 15 may be of the same size or of different sizes. Specifically, the openings 11, 15 serve for filling the respective chamber 3, 5. The first chamber 3 is designed to be filled with a baby food concentrate, whereas the second chamber 5 is designed to be filled with a fluid. The fluid may be, for example, water (specifically sterile water) which, when mixed with the baby food concentrate, produces a baby milk or a baby puree. Preferably, the bag 1 is filled in advance (for example, already at home) to provide a pre-portioned bag 1 for a later time (for example, on the go).

In order to close the chambers 3, 5 for transport, the individual openings 11, 15 in the bag 1 can be closed by means of corresponding closures. For this purpose, a first connecting element 17 may be provided at the first opening 11 and a second connecting element 19 may be provided at the second opening 15. The connecting elements 17 and/or 19 can thereby be formed as circular elements, which are preferably made of plastic. Specifically, it is advantageous in this case if the connecting elements 17, 19, in contrast to the bag 1 itself, are designed to be rigid or to have a higher rigidity. In order to connect the connecting elements 17, 19 to the bag 1, the connecting elements 17, 19 can be welded to the bag 1.

As shown in FIG. 1, the closure or closures may be in the form of covers 21, each of which can be connected to the connecting elements 17, 19. The covers 21 may be connected to the connecting elements by means of a hooking or clicking mechanism. Alternatively, the connecting elements 17, 19 and/or the covers 21 may have one or more sealing lips which, when in contact with the respective other element, have both a sealing and a fixing function. FIG. 1, on the other hand, shows a screw mechanism. On an outer surface 23 of the connecting element 17 or 19 and on an inner surface 25 of the cover 21 there is in each case, at least in some areas, a thread 27 which engages in one another or interacts with one another in the connecting process.

Specifically, the connecting element 17 or 19 can also be used to be connected to a dispenser which is designed, for example, to dispense a baby food concentrate into the first chamber 3. Specifically, it is preferred that the bag 1 is compatible with a dispenser such as published in the publication WO 2017/121638 A1 and/or in the German patent application DE 10 2018 009 551, which are incorporated herein by reference in their entirety. The connecting element 17 and/or 19 may be connected to the dispenser directly herein or by means of an adapter. The amount of baby food concentrate may be manually adjusted at the dispenser. Alternatively, the dispenser dispenses predetermined or preportioned units to the bag 1. However, the dispenser may also comprise a sensor that automatically detects a connected bag 1 and, in a complementary manner, the size of the bag 1. Specifically, based on the size of the connected connecting element 17, 19 the dispenser could detect whether it is the powder chamber or water chamber. Depending on which chamber the dispenser detects, the dispenser then dispenses either water or powder. The size of the connected connecting element 17, 19 may thereby also provide information to the dispenser as to how much water or powder is to be dispensed. Alternatively, an RFID tag could be provided or incorporated in or on the connecting element 17, 19 for this purpose. Once the dispenser detects a bag 1, a corresponding amount of a baby food concentrate can subsequently be dispensed automatically. This is also possible with respect to the second chamber 5 and the supply of a fluid. Thus, by being compatible with a dispenser, the chambers 3, 5 can be filled quickly and precisely.

Preferably, the bag size is such that between 50 ml and 300 ml of baby food can be produced. Particularly preferred is a size that allows 250 ml of baby food to be produced. Furthermore, the bag 1 may be folded in areas so that the chamber(s) 3, 5 are reduced in size. As required, the folding may be unfolded. The folded area may be fixed with an adhesive strip and/or a clamp.

Figure 1C:
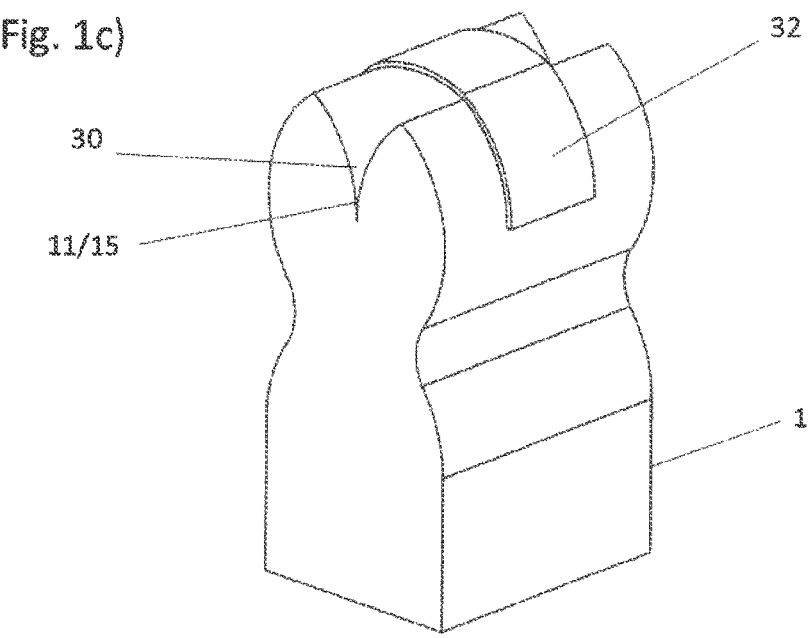
FIG. 1a) shows a sectional view of a bag for producing baby food along a longitudinal axis according to a preferred embodiment.
FIG. 1d) show schematic drawings of bags with alternative separating regions; and e)

However, the bag 1 may also be formed without connecting elements 17 and/or 19. In order to close the openings 11 and/or 15 of the bag 1 for storage and transport, the openings 11 and/or 15 can be welded after the individual chambers have been filled. To do this, as shown in FIG. 1*b*), the desired opening 11, 15 is welded with a welding device 26 containing at least one welding wire 28. This can be done by the user or the bag 1 is already filled in the manufacturing process and sealed by means of a welding device 26. Furthermore, at least one sealing lip 30 may be formed at the respective openings 11 and/or 15, which allows the corresponding chamber 3, 5 to be filled but prevents the filled element from escaping again. Once the chamber 3, 5 is filled, the sealing lip 30 can additionally be closed with a seal 32 to prevent the sealing lip (30) from spreading, as shown in FIG. 1*c*). Only when the seal 32 has been removed and the sealing lip 30 is spread, the mixed baby food can escape from the bag 1. Alternatively, the openings may be closed by separate clamps.

If baby food is now required at a later time (e.g. while travelling, for example), only the separating region 7 can be at least partially opened. For this purpose, it is sufficient if force is applied to the bag 1 from the outside. If the separating region 7 is designed, for example, by a weld seam, the force is to be applied in such a way that the bag sides, which are connected to one another by the weld seam, at least partially separate from one another again as a result of the force applied. However, the bag sides themselves are not damaged in the process, so that leakage of the filled components is avoided. Once the separating region 7 has been opened, the filled components can be mixed together, so that subsequently the baby food is produced. Preferably, the bag 1 can be shaken.

The force to be applied may, for example, be applied by pushing on the bag 1 and/or by pulling the bag 1 substantially along the longitudinal direction L.

Alternatively, or in addition to a weld seam, the separating region 7 can also have at least one folded edge 34, as shown in FIG. 1*d*). At the folded edge 34, the bag 1 is folded in the separating region 7 by an angle of up to about 180°, preferably so that the first chamber 3 and the second chamber 5 lie substantially on top of each other. The folded state is specifically fixed by a fixing adhesive tape 36, which is specifically arranged in the separating region 7 to fix the folded area. If the individual components are to be mixed to form baby food, the first chamber 3 and second chamber 5 can be unfolded so that the separating region 7 is opened.

Further, the separating region 7 between the first chamber 3 and the second chamber 5 may include a clamp that clamps the bag 1 in the separating region 7. By opening the clamp, the separating region 7 is opened.

As a still further alternative, the separating region 7 may be formed by twisting the bag 1 in the separating region 7. The twisted state of the bag 1 may be fixed by a seal 38 (e.g. adhesive tape). If the user pulls on the bag 1 substantially along the longitudinal direction L, the seal breaks and the twist of the bag 1 may be released, allowing the components contained in the bag 1 to mix. In addition to the twist, the bag 1 may be folded as described above, as shown in FIG. 1*e*).

Figure 2:
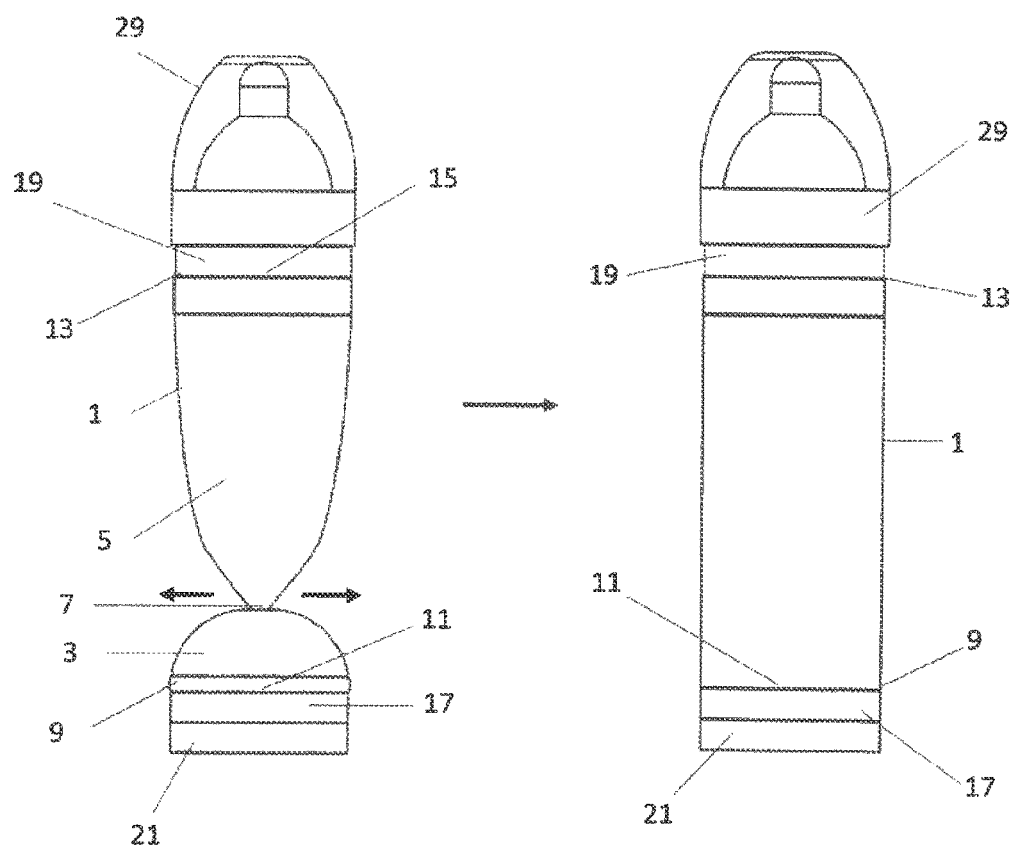
FIG. 2 shows the bag of FIG. 1a) before opening the separating region and after opening the separating region.

Before or after opening the separating region 7, the cover 21 on one side of the bag 1 can be replaced, specifically by a nipple 29. FIG. 2 shows on the left a state of the bag 1 in which the separating region 7 is not yet open, but the second opening 15 is no longer closed by a cover 21, but is replaced by a nipple 29. As soon as the separating region 7 is now open and the individual components in the bag 1 are mixed, the baby can thus consume the baby food directly from the bag 1. To this end, a state of the bag 1 in which the separating region 7 has been at least partially opened is shown on the right in FIG. 2.

However, since babies should preferably not eat their baby food cold, it is advantageous that the baby food in the bag 1 can be heated beforehand.

Figure 3:
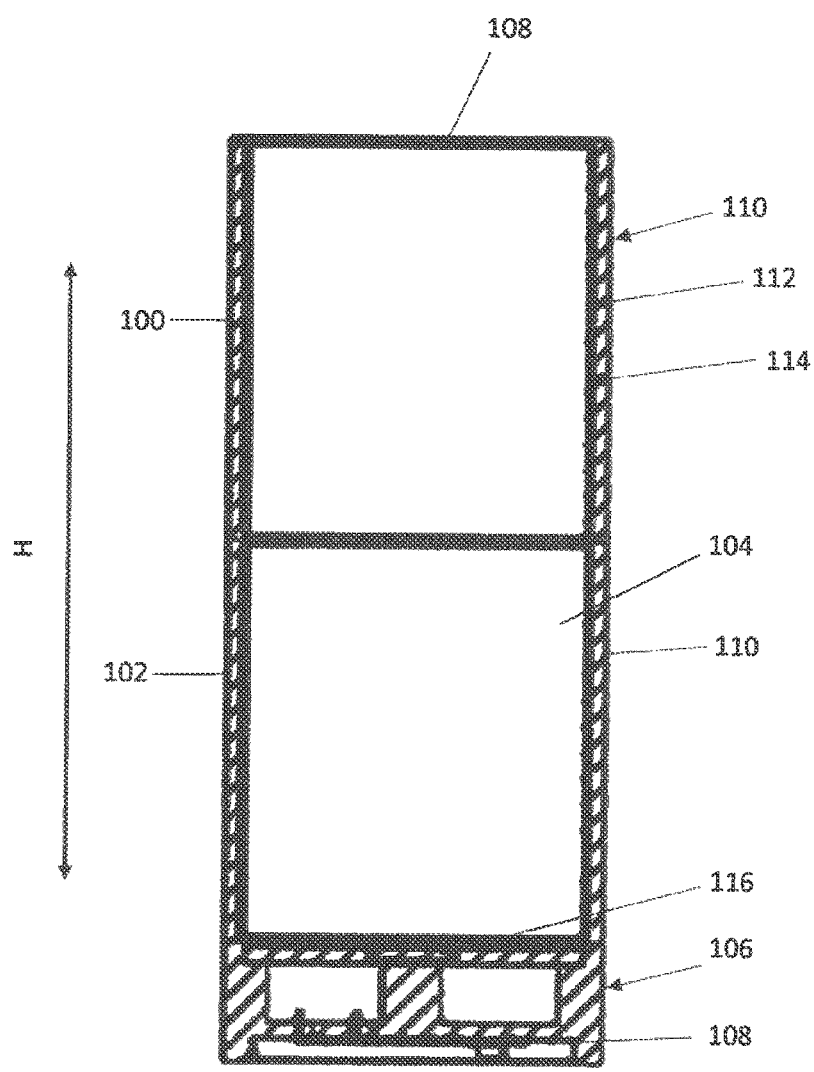
FIG. 3 shows a sectional view of a tempering module according to a preferred embodiment.

For this purpose, the bag 1 is at least partially insertable into a tempering module 100, as shown in FIG. 3.

The tempering module 100 has a tempering module housing 102, which is preferably rotationally symmetrical in shape. However, only a tempering module interior 104 may be rotationally symmetrically shaped, while the exterior shape of the tempering module housing 102 is freely selectable. In addition, the tempering module housing 102 has a tempering module base surface 106 that is attachable to a connecting unit described later. On a side opposite to the tempering module base surface 106, there is a tempering module insertion opening 108 via which the bag 1 can be at least partially inserted into the tempering module 100.

During the tempering process, the tempering module insertion opening 108 may be closed by a cover (not shown). However, it is also possible that the nipple 29 which is positioned on the bag 1, substantially closes the tempering module insertion opening 108, as shown in FIG. 4. Specifically, it is preferred that the diameter of the nipple 29 and/or the diameter of the connecting element 19, which is connected to the nipple 29, is larger than the diameter of the tempering module insertion opening 108, so that slipping of the nipple 29 and/or the connecting element 19 into the tempering module interior 104 can be prevented (see FIG. 4). The height H of the tempering module interior 104 is preferably adjusted so that the bag 1 can be arranged in a preferably stretched position in the tempering module interior 104. In this way, a faster tempering of the contents of the bag 1 or of the baby food can be achieved. The height H of the tempering module interior 104 can thereby either be defined by the length of the tempering module 100 as such, or can be combined as desired by tempering module extension elements 110. The individual tempering module extension elements 110 can be clicked together or screwed together. FIG. 3 shows a condition in which two tempering module extension elements 110 are connected to each other. The lowest extension element 110 is preferably firmly connected to the tempering module base surface 106 and serves as the base module.

Alternatively, the individual tempering module extension members 110 may be interconnected such that they are scoverable relative to each other to allow the size of the tempering module 100 or tempering module interior 104 to be adjusted to the size of the bag 1.

Since the tempering module 100 may comprise individual tempering module extension elements 110, the size of the tempering module 100 may be reduced, particularly during transport.

More preferably, the tempering module 100 has a height H of from about 80 mm to about 140 mm. Preferably, the wall thickness of the tempering module 100 is in a range between about 0.5 mm and about 1.0 mm. A wall thickness of about 0.8 mm is particularly preferred. An inner diameter of the tempering module 100 is preferably between about 45 and about 70 mm.

At least one heating element is arranged on at least one area of an inner wall 112 of the tempering module housing 102. The heating element can heat the inner wall 112 of the tempering module housing 102, preferably the heating element is located outside the tempering module interior 104. In other words, the inner wall 112 can be heated from the outside by the heating element and the heat is transferred to the tempering module interior 104 via the inner wall 112. As shown in FIG. 3, the heating element is preferably formed as a heating mat 114 that at least partially overlaps the inner wall 112 of the tempering module housing 102. Alternatively, the heating element may be formed as a heating plate, heating foil or heating board. In the following, however, only the heating mat 114 according to FIG. 3 will be discussed by way of example. However, the explanations also apply to the other alternatives of a heating element.

Preferably, the inner wall 112 of the tempering module housing 102 is at least partially made of a thermally conductive material, such as aluminum or copper. For this purpose, the inner wall 112 may be manufactured as a tubular element made of aluminum or copper. As manufacturing tolerances for the diameter of the tubular element, +/−1 mm is preferred. Hereby, the heat generated by the heating mat 114 can be substantially evenly distributed via the tempering module housing 102 and delivered into the tempering module interior 104. Thus, the contents of the bag 1 or the baby food can be heated evenly.

In order to achieve the fastest possible tempering of the contents of the bag 1 or the baby food, the tempering module interior 104 is dimensioned in relation to the bag 1 such that the bag 1 in the inserted state is in contact with the inner wall 112 at least in some areas. The more area of the bag 1 is in contact with the inner wall 112, the faster heating can occur. If the tempering module housing 102 has a plurality of tempering module extension elements 110, preferably each tempering module extension element 110 comprises at least one heating element. In order to provide power to each of the individual heating elements on the tempering module extension elements 110, it is necessary to provide connection between the tempering module extension elements 110 that allows power to be transferred from the tempering module base surface 106 to the individual heating elements.

In addition, it is advantageous if heat-conducting particles are incorporated into the material of the bag 1. These enable an even better transfer of heat to the baby food. The particles can be aluminum or copper particles.

In addition, at least one first magnet 116 may be arranged in the tempering module base surface 106, which interacts with at least one second magnet 31 (see e.g. FIG. 1a)). The second magnet 31 is arranged in or on the cover 21 of the bag 1, which is arranged adjacent to the tempering module base surface 106 in the inserted state of the bag 1. This fixes and/or elongates the bag 1 to the tempering module base surface 106 when the nipple 29 remains outside the tempering module housing 102.

The bag 1 is arranged in the tempering module 100 with as few folds as possible. Specifically, as much surface of the bag as possible is in contact with the heated inner wall 112 of the tempering module 100, so that as little insulating air as possible is located between the bag 1 and the inner wall 112. Specifically, the hydrostatic pressure of the baby food in the bag 1 presses the bag 1 against the inner wall 112.

In addition, tempering module terminal contacts 118 are positioned in the tempering module base surface 106, via which the tempering module 100 can be connected to the connecting unit. Specifically, the heating mat 114 can thereby be connected.

Specifically, the tempering module 100 is configured such that the tempering module 100 can additionally be used as a holding device for the bag 1. Specifically, after the baby food has been tempered in the bag 1, the baby can drink directly from the bag 1 which is held in the tempering module 100. via this, the user can hold a stable element resembling a bottle while the flexible bag 1 is arranged inside the tempering module 100.

In the following, the connecting unit 200 will now be described, which is shown, for example, in FIG. 4 (see steps 3 and 4 of the tempering process).

Figure 5A:
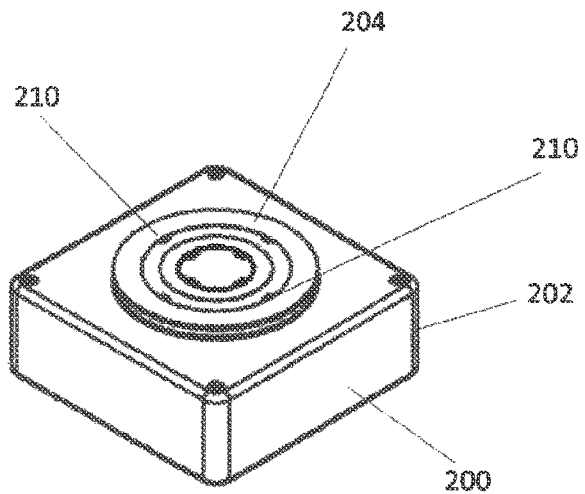
FIG. 5 shows different views of a connecting unit.

The connecting unit 200 has a connecting unit housing 202 (see FIG. 5a)), the upper surface of which is a connection surface 204 onto which the tempering module 100, specifically the tempering module base surface 106, can be placed. Preferably, the tempering module 100 can be clicked onto the connecting surface 204 by a click mechanism. This allows the tempering module 100 to be securely connected to the connecting unit 200. Furthermore, the click mechanism can already be used to start the temperature control process as soon as the tempering module 100 is clicked onto the connection surface 204.

Figure 5B:
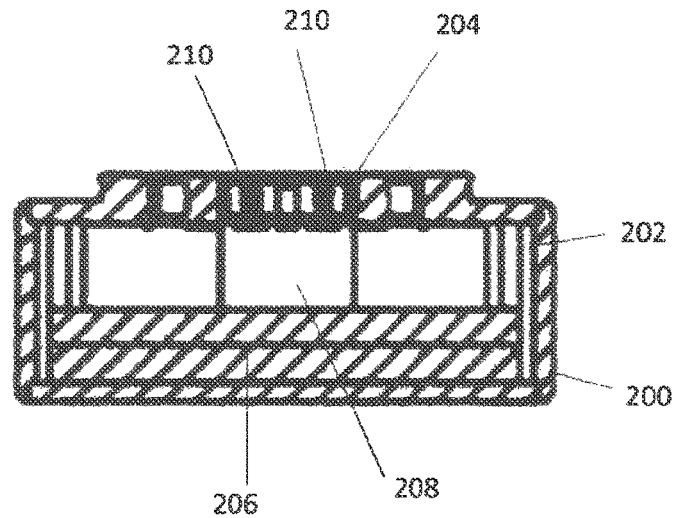

FIG. 5*b*) shows a sectional view of the connecting unit 200, showing that at least one rechargeable battery 206 (e.g. a lithium polymer rechargeable battery) is arranged inside the connecting unit housing 202. This serves as an energy storage device, which supplies energy to the tempering module 100 when needed to provide power to the heating element. The rechargeable battery 206 makes it possible to always have energy available for tempering for baby food when on the move—independent of a power outlet. For example, by means of a USB port or a conventional power cable, the rechargeable battery 206 can be at least partially recharged. The rechargeable battery 206 as well as the heating mat 114 is thereby preferably designed in such a way that both liquid and frozen baby food can be heated in the tempering module 100. Frozen baby food may be, for example, frozen breast milk stored in a bag 1.

Furthermore, a control unit 208 is arranged in the interior of the connecting unit housing 202, which is connected to the accumulator 206 in order to start and stop a tempering process by delivering energy to the heating element or by stopping the delivery. The duration of the tempering process may be determined by a fixed predefined time, or may occur as a function of an achieved temperature reached in the tempering module interior 104. For this purpose, a sensor may be provided in the tempering module interior 104 that measures the temperature in the tempering module interior 104 (e.g., regularly or at different times) and transmits the measured data to the control unit 208. Depending on the measured temperatures, the control unit 208 then controls the further tempering process. This function can also be used to maintain baby food in the tempering module 100 at a predetermined or predeterminable temperature. For example, the desired temperature may be set at the connecting unit 200. In addition, switches may be located on the connecting unit 200 to trigger a start and/or stop of the tempering process. Alternatively or additionally, the connecting unit 200 may be controllable via an app.

FIG. 5*b*) also shows connecting unit terminal contacts 210 located in the connection area 204 and designed to connect the tempering module terminal contacts 118.

The set can be supplemented with a sterilization module 300 for sterilizing baby accessories, such as baby pacifiers or nipples.

Figure 6:
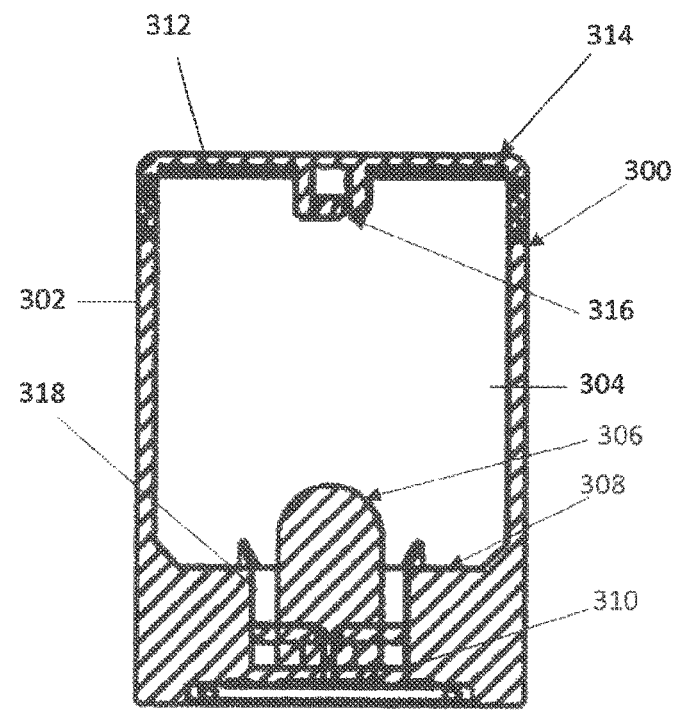
FIG. 6 shows a sectional view of a sterilization module according to a preferred embodiment.

The sterilization module 300 includes a sterilization module housing 302 with a sterilization module interior 304 formed therein. At least one UV lamp or LED 306 is positioned in the sterilization module interior 304 and is configured to sterilize the baby accessories positioned in the sterilization module interior 304. Preferably, the UV lamp 306 is located on a sterilization module base surface 308 of the sterilization module housing 302, as shown in FIG. 6. However, the at least one UV lamp 306 may be located on any other surface of the sterilization module interior 304. Additionally, at least one UV mirror and/or at least one reflective surface may be positioned within the sterilization module housing 302.

The UV lamp or LED 306 is connected to sterilization module 310 formed in the sterilization module base surface 308. In order to perform the sterilization process, the sterilization module 300 is also connectable to the connecting unit 200. For this purpose, the sterilization module terminal contacts 310 connect the connecting unit terminal contacts 210. Again, a click mechanism may be used to automatically start the sterilization process. Alternatively, switches on the connecting unit 200 may be used to manually start or stop the sterilization process. Further, the sterilization process may be defined by a fixed predetermined or predeterminable time such that the sterilization process is automatically stopped by the control unit 208 after this time. When the sterilization process is started, the control unit 208 delivers energy from the rechargeable battery 206 to the UV lamp or LED 306.

The sterilization module housing 302 further includes a sterilization module insertion opening 312 via which the baby accessories are insertable into the sterilization module interior 304. As shown in FIG. 6, the sterilization module insertion opening 312 is preferably located at or near an upper surface of the sterilization module housing 302. The sterilization module insertion opening 312 may be closed by a sterilization module cover 314. This is fitted using a click mechanism, sealing lips or a screw mechanism (see FIG. 6).

At least one retaining device 316 may be arranged on the sterilization module cover 314, into which the ring of a baby pacifier may be hooked. Preferably, the retaining device 316 is or contains a hook.

The sterilization module base surface 308 can serve as a support surface for a nipple. Preferably, the at least one UV lamp or LED 306 is located at least partially in a bottom recess 318 (see FIG. 6) to ensure unobstructed placement of the nipple.

The additional sterilization module 300 can also be used to easily sterilize baby accessories on the go, which are reused. For this purpose, the connecting unit 200 can be used to operate both the tempering module 100 and the sterilization module 300. Before sterilization, the baby accessories can be cleaned with water or a wet wipe.

Although FIGS. 4 and 5 show only connecting units 200 with a connector surface 204, additional connector surfaces 204 may also be provided on the connecting unit 200 to allow parallel tempering and sterilization.

LIST OF REFERENCE SIGNS 1 bag
3 first chamber
5 second chamber
7 separating region
9 first end of the bag
11 first opening
13 second end of the bag
15 second opening
17 first connecting element
19 second connecting element
21 cover
23 outer surface of the connecting element
25 inner surface of the cover
26 welding device
27 thread
28 welding wire
29 nipple
30 sealing lip
31 second magnet
32 seal
34 folding edge
36 adhesive tape
38 seal
100 tempering module
102 tempering module housing
104 tempering module interior
106 tempering module bottom area
108 tempering module insertion opening 110 tempering module extension element
112 inner wall of the tempering module housing
114 heating mat
116 first magnet
118 tempering module terminal contact
200 connecting unit
202 connecting unit housing
204 connection area
206 rechargeable battery
208 control unit
210 connecting unit terminal contacts
300 sterilization module
302 sterilization module housing
304 sterilization module interior
306 UV lamp
308 sterilization module base surface
310 sterilization module terminal contact
312 sterilization module insertion opening
314 sterilization module cover
316 holding device
318 bottom recess
L longitudinal direction
H height

The invention claimed is:

1. Process for producing baby food, specifically baby milk or baby puree, comprising:
providing a bag (1) with a first chamber (3) and a second chamber (5) which are separated from one another by a separating region (7);
filling a baby food concentrate into the first chamber (3) via a first opening (11) in the bag (1) which is designed adjacent to the first chamber (3);
filling a fluid into the second chamber (5) via a second opening (15) in the bag (1) which is designed adjacent to the second chamber (5);
closing the first opening (11) with a first closure and the second opening (15) with a second closure;
applying force to the bag (1) so that the separating region (7) is at least partially opened and the components contained in the first and second chamber (3, 5) are mixed with one another to form baby food; and
inserting the bag (1) in which the mixed components are located into a tempering module (100) via a tempering module insertion opening (108) for tempering the baby food,
wherein the closure of the bag (1), which when inserted into the tempering module (100) is arranged adjacent to a tempering module base surface (106), contains at least one magnet (31) which is connected to a magnet (116) in the tempering module base surface (106).

2. Process according to claim 1, wherein the closing the first and second openings (11, 15) comprises screwing on a cover (21).

3. Process according to claim 2, wherein after mixing, the cover (21) is replaced by a nipple (29).

4. Process according to claim 1, wherein the bag (1) is inserted into the tempering module (100) in such a way that a nipple (29), arranged on the first or second opening (11, 15) of the bag (1), or a connecting element (17, 19), which is positioned at the first or second opening (11, 15), rests on an edge of the tempering module insertion opening (108) to prevent the nipple (29) or the connecting element (17, 19) from slipping into the tempering module (100).

5. Process according to claim 1, wherein the first and/or second chamber of the bag is filled via a dispenser which can be connected with the connecting element (17, 19) on the corresponding chamber.

* * * * *